United States Patent
Fujiyoshi et al.

(10) Patent No.: US 8,212,975 B2
(45) Date of Patent: Jul. 3, 2012

(54) LIQUID CRYSTAL DISPLAY DEVICE

(75) Inventors: Jun Fujiyoshi, Mobara (JP); Yasukazu Kimura, Chiba (JP); Daisuke Sonoda, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 53 days.

(21) Appl. No.: 12/828,618

(22) Filed: Jul. 1, 2010

(65) Prior Publication Data
US 2011/0001910 A1 Jan. 6, 2011

(30) Foreign Application Priority Data
Jul. 6, 2009 (JP) .................. 2009-159823

(51) Int. Cl.
*G02F 1/1339* (2006.01)
(52) U.S. Cl. .................. 349/106; 349/155; 349/162
(58) Field of Classification Search .................. None
See application file for complete search history.

(56) References Cited

U.S. PATENT DOCUMENTS

| | | | | |
|---|---|---|---|---|
| 4,470,667 A * | 9/1984 | Okubo et al. | .................. | 349/42 |
| 5,757,451 A * | 5/1998 | Miyazaki et al. | .................. | 349/106 |
| 5,815,232 A * | 9/1998 | Miyazaki et al. | .................. | 349/155 |
| 5,917,572 A * | 6/1999 | Kurauchi et al. | .................. | 349/156 |
| 6,833,899 B2 * | 12/2004 | Sunohara et al. | .................. | 349/142 |
| 6,917,401 B2 * | 7/2005 | Goang et al. | .................. | 349/106 |
| 2007/0103634 A1 * | 5/2007 | Kim et al. | .................. | 349/154 |
| 2009/0268131 A1 * | 10/2009 | Tsai et al. | .................. | 349/106 |

FOREIGN PATENT DOCUMENTS

| | | | |
|---|---|---|---|
| JP | 2002-006132 | | 1/2002 |
| JP | 2002-55335 A | * | 2/2002 |
| JP | 2006-113204 | | 4/2006 |

* cited by examiner

*Primary Examiner* — Mike Stahl
(74) *Attorney, Agent, or Firm* — Antonelli, Terry, Stout & Kraus, LLP.

(57) ABSTRACT

A liquid crystal display device according to the invention includes a first substrate, on a surface of which are formed: a first color film which has a color other than black, and one portion of which configures a first pixel; a second color film, one portion of which configures a second pixel adjacent to the first pixel; a third color film, at least one portion of which configures a third pixel; and a fourth color film, a second substrate, and a liquid crystal layer sandwiched between the first substrate and second substrate, wherein the first color film and second color film have a first overlapping portion in which they overlap each other in the boundary between the first pixel and second pixel, and the fourth color film, being formed on the first overlapping portion, configures a post spacer which defines the space between the first substrate and second substrate.

5 Claims, 5 Drawing Sheets

LIQUID CRYSTAL DISPLAY DEVICE

CROSS-REFERENCE TO RELATED APPLICATION

The present application claims priority from Japanese application JP 2009-159823 filed on Jul. 6, 2009, the content of which is hereby incorporated by reference into this application.

BACKGROUND OF THE INVENTION

The present invention relates to a liquid crystal display device.

A liquid crystal display device having a liquid crystal layer sandwiched by two transparent substrates of glass or the like, by applying a voltage to electrodes (called pixel electrodes) formed on one of such substrates in a reticular pattern, and generating an electric force line between the pixel electrodes and an electrode (called a common electrode) formed on the same substrate or the other substrate, changes a liquid crystal molecular orientation direction, and controls a light transmittance. In general, with a liquid crystal display device called an active matrix type, by allowing and blocking conduction to the pixel electrodes by means of switching elements, such as TFT's (Thin Film Transistors), provided one on each pixel electrode, a predetermined voltage is applied between the pixel electrodes and common electrode, maintaining the liquid crystal molecular orientation direction for a certain period.

With such a liquid crystal display device, it is necessary to keep the space between the two substrates constant, for which reason a member called a spacer is inserted between the two substrates. In days gone by, transparent beads were used as the spacer, but in recent years, it has been the practice to use a photopolymer to construct on a substrate a columnar structural object called a post spacer, a photo spacer, or a columnar spacer.

However, when manufacturing a liquid crystal display device, it is possible to cut its manufacturing costs in the event that it is possible to reduce the number of manufacturing processes, and reduce the kinds of material used. For this reason, an attempt has been made to create the heretofore described post spacer without using a dedicated process and material.

A liquid crystal display device in which a post spacer is formed by stacking three kinds of material, red, blue, and green, which form color filter layers, on a black matrix is described in JP-A-2002-6132.

A liquid crystal display device in which a post spacer is formed by stacking three kinds of material, red, blue, and green, which form color filter layers is described in JP-A-2006-113204. In the invention described in JP-A-2006-113204, the height of the post spacer is controlled by making the thickness of a red color film different between a portion functioning as a pixel and a portion functioning as the post spacer.

SUMMARY OF THE INVENTION

In the event that it is possible to form the post spacer by utilizing color films forming the color filter layers, as in the heretofore described references cited, it is considered to be advantageous because it is possible to reduce the number of processes and the kinds of material. However, with the invention described in JP-A-2002-6132, as the height of the post spacer is fixed due to the thickness of each of the red, blue, and green color films forming the color filter layers, it is not possible to optionally set the space between substrates. Also, with the invention described in JP-A-2006-113204, as the thickness of the red color film is made different between the portions in the same film, it is necessary to carry out an exposure twice, so the number of processes is increased, and a photomask is required in addition.

The invention having been contrived bearing in mind such a point of view, an object thereof is to provide a liquid crystal display device which includes a post spacer whose height can be controlled with a small number of processes and a low cost.

To simply describe the outlines of typical ones among the aspects of the invention disclosed in the present application, they are as follows.

1. A liquid crystal display device includes a first substrate, on a surface of which are formed: a first color film which has a color other than black, and one portion of which configures a first pixel; a second color film which has a color, other than black, which differs from that of the first color film, and one portion of which configures a second pixel adjacent to the first pixel; a third color film which has a color, other than black, which differs from those of the first color film and second color film, and at least one portion of which configures a third pixel; and a fourth color film which has a color, other than black, which differs from those of the first color film and second color film, a second substrate, and a liquid crystal layer sandwiched between the first substrate and second substrate, wherein the first color film and second color film have an overlapping portion in which they overlap each other in the boundary between the first pixel and second pixel, and the fourth color film, being formed on the overlapping portion, configures a spacer which defines the space between the first substrate and second substrate.

2. With the liquid crystal display device according to 1, the sum of the thicknesses of the first color film and second color film in the overlapping portion is smaller than the sum of the thickness of the first color film in the first pixel and the thickness of the second color film in the second pixel.

3. With the liquid crystal display device according to 1, the fourth color film is of the same color as the third color film.

4. With the liquid crystal display device according to 1, a conductive film and an insulating film are formed on top of the first pixel, second pixel, and third pixel, and the top surface of the fourth color film is such that the fourth color film is exposed.

5. With the liquid crystal display device according to 1, a plurality of scan signal lines, a plurality of video signal lines, and switching elements provided one in each pixel, are formed on the first substrate.

6. With the liquid crystal display device according to 5, the overlapping portion is provided in such a way as to overlap each of the scan signal lines or video signal lines.

According to the above aspects of the invention disclosed in the application, it is possible to provide a liquid crystal display device which includes the post spacer whose height can be controlled with a small number of processes and the low cost.

DETAILED DESCRIPTION OF THE INVENTION

Hereafter, a description will be given, referring to FIGS. 1 to 3, of a first embodiment of the invention.

Figure 1:
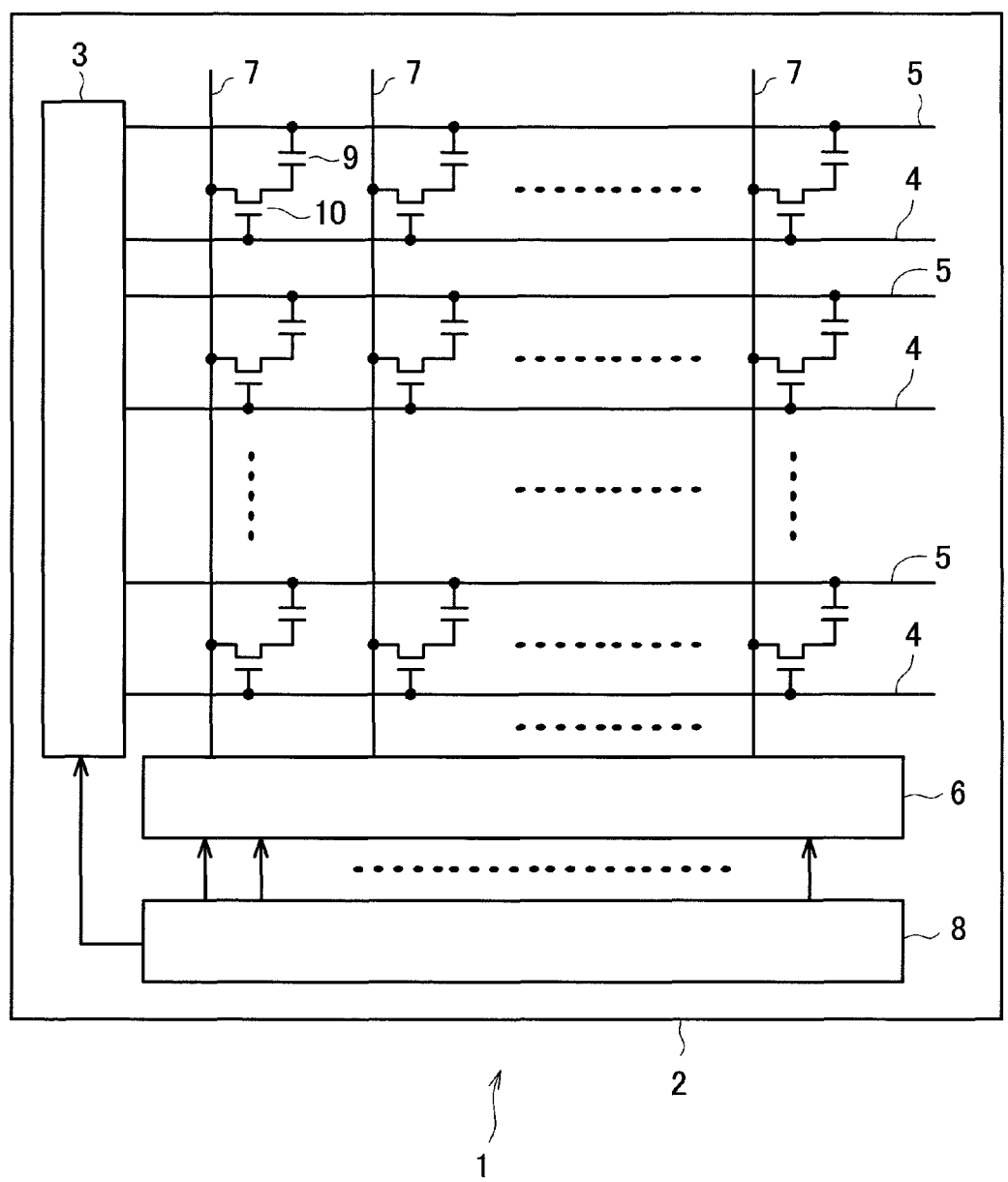
FIG. 1 is an overall view showing a circuit disposition of a liquid crystal display device according to a first embodiment.

FIG. 1 is an overall view showing a circuit disposition of a liquid crystal display device 1 according to the embodiment. The liquid crystal display device 1 according to the embodiment including a large number of pixels in a reticular pattern, the circuits shown in the same drawing are formed on a first substrate 2 which is a transparent substrate of glass or the like. Although the number of pixels varies according to the resolution of the liquid crystal display device 1, in the case of a liquid crystal display device 1 for full-color display having a so-called VGA resolution, 1920 columns of 640 pixels by three colors are disposed in the horizontal direction, and 480 rows of pixels in the vertical direction. Scan signal lines 4 are provided extending in the horizontal direction from a scanning circuit 3 so as to correspond to the individual rows of pixels. Common signal lines 5 are signal lines which supply a potential to be applied to common electrodes. How the common signal lines 5 are disposed relates to what kind of potential is applied to the common electrodes. For example, with a method called a so-called line inversion drive whereby a different potential is applied to each column of pixels, in the same way as the scan signal lines 4, the common signal lines 5 are also provided so as to correspond to the individual rows of pixels. Also, with a method called a frame inversion drive whereby a common potential is applied to all the pixels, it is sufficient to simply connect all the common electrodes, while with other methods, there is also a possibility of wiring the common signal lines more intricately. In the embodiment, the line inversion drive method is illustrated as being employed, but any method of applying a potential to the common electrodes is acceptable.

Meanwhile, video signal lines 7 extending from a distribution circuit 6 are provided in the vertical direction of the pixels so as to correspond to the individual columns of pixels. The distribution circuit 6 is a circuit which distributes video signals input from a drive circuit 8 in accordance with the color of each pixel. More specifically, when a video signal corresponding to red is input from the drive circuit 8, the distribution circuit 6 connects only a video signal line 7 corresponding to red pixels to the drive circuit 8, and cuts off the other video signal lines 7. The same applies to green and blue.

The drive circuit 8 is a circuit which, based on the signal of a video input from an external instrument, generates a signal to be input into the scanning circuit 3 and distribution circuit 6. In general, an IC on which the drive circuit 8 is formed is often used, but the drive circuit 8 may also be directly formed on the first substrate 2.

Rectangular regions, surrounded by the scan signal lines 4 and video signal lines 7, forming the individual pixels, a pixel electrode is formed in each pixel, and each pixel electrode is disposed in such a way that an electric force line formed between it and the opposed common electrode passes through a liquid crystal layer. Consequently, in FIG. 1, a capacitor 9 (a liquid crystal capacitor, a pixel capacitor) is equivalently formed between each of the pixel electrodes and the common electrode. Also, a switching element 10 such as a TFT being formed in each pixel, the scan signal line 4 is connected to the gate of the switching element 10, and the video signal line 7 is connected to the source or drain thereof. Whether the video signal line 7 is connected to the source or connected to the drain depends upon the type of switching element. With regard to the capacitors 9 and switching elements 10, in order to avoid complication, the reference numerals thereof are shown only in one place in the drawing.

Figure 2:
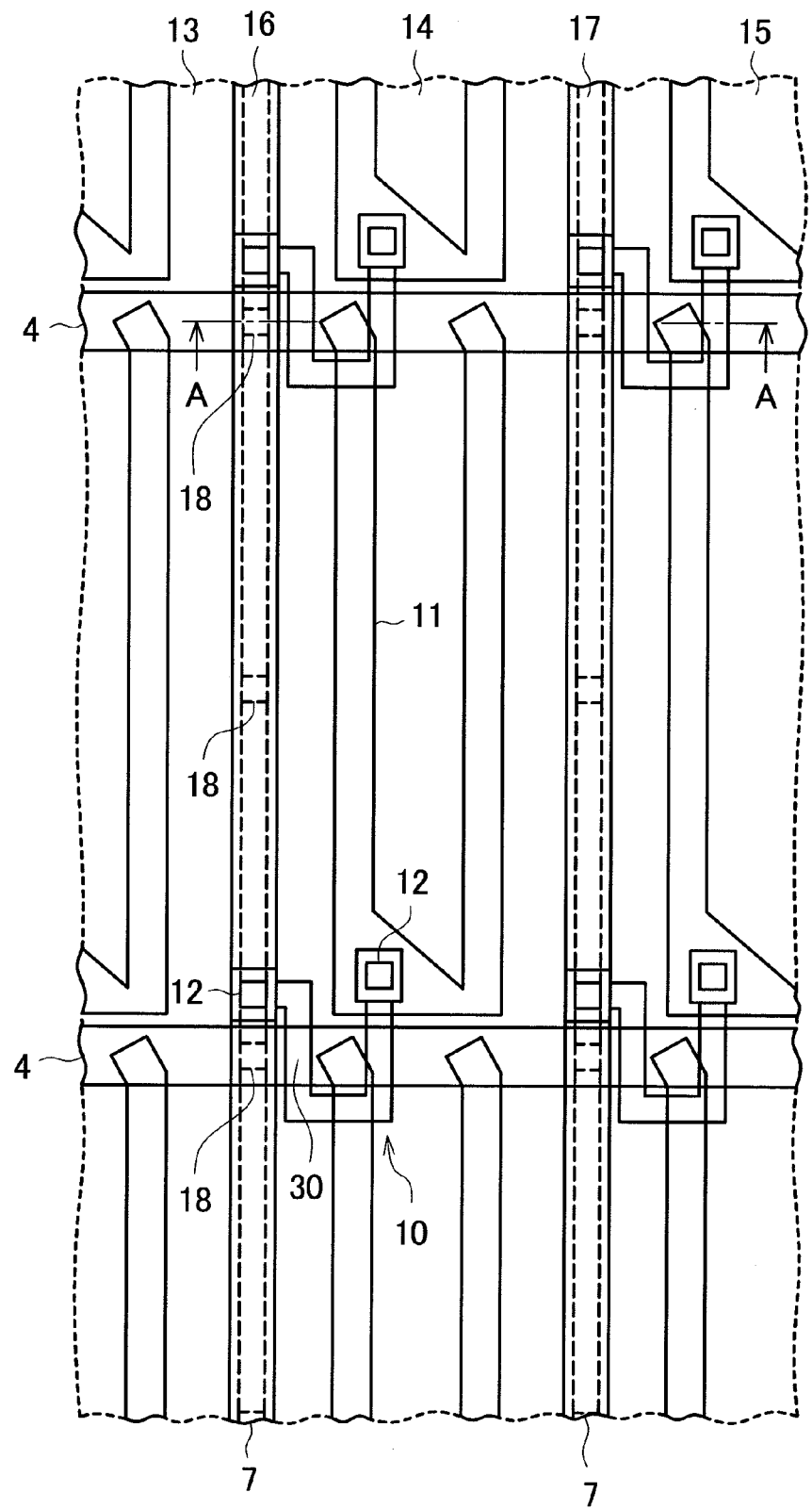
FIG. 2 is an enlarged view of a pixel portion of the liquid crystal display device according to the first embodiment.

FIG. 2 is an enlarged view of a pixel portion of the liquid crystal display device 1 according to the embodiment. As shown in the same drawing, a pectinate pixel electrode 11, being formed inside a pixel surrounded by the scan signal lines 4 and video signal lines 7 formed on the first substrate 2, is opposed to the unshown common electrode formed on the first substrate 2 in the same way. The reason that the pixel electrode 11 is formed in this kind of shape is that the liquid crystal display device 1 according to the embodiment employs a horizontal electric field method called IPS (In-Plane Switching) for the liquid crystal drive method. With a liquid crystal display device of a vertical electric field method called VA (Vertical Alignment) or TN (Twisted Nematic), as will be described hereafter, when taking a substrate on which a pixel electrode is formed to be a first substrate, a common electrode is formed on a second substrate, so it is sufficient that the shape of the pixel electrode is a rectangle covering a pixel.

The pixel electrode 11 and video signal line 7 are connected to the switching element 10 by a contact hole 12. On a predetermined voltage being applied to the scan signal line 4, the switching element 10 causes the pixel electrode 11 and video signal line 7 to be continuous. In FIG. 2, the switching element 10 is configured of a thin film transistor having a semiconductor layer 30. The semiconductor layer 30 is formed from, for example, amorphous silicon, polycrystalline silicon, or microcrystalline silicon.

Regions shown by the broken lines in the same drawing, each of which covers a plurality of pixels aligned in the vertical direction, are color films forming color filter layers. In the drawing, a first color film 13, which is a red color film, a second color film 14, which is a green color film, and a third color film 15, which is a blue color film, are formed from the left. The first color film 13 is formed in such a way that an edge thereof lies on the video signal line 7. Also, the second color film 14 is also formed in such a way that an edge thereof lies on the video signal line 7, and a first overlapping portion 16 is formed in which the first color film 13 and second color film 14 overlap each other on the video signal line 7. With regard to the second color film 14 and third color film 15 too, in the same way, a second overlapping portion 17 is formed in which they overlap each other on the video signal line 7. In other words, one portion of the first color film 13 forms a first pixel which is a red pixel, and the other portion is disposed on the video signal line 7. Also, with regard to the second color film 14 too, in the same way, one portion thereof forms a second pixel which is a green pixel, and the other portion is disposed on the video signal line 7. With regard to the third color film 15 too, in the same way, at least one portion thereof forms a third pixel which is a blue pixel. Herein, each color film is formed in a striped form elongated in a direction parallel to the video signal line, but the invention is not limited to this. Furthermore, fourth color films 18 are further provided intermittently in the first overlapping portion 16 in which the first color film 13 and second color film 14 overlap each other. The fourth color films 18 are of the same color as the third color film 15, that is, in the embodiment, blue.

Figure 3:
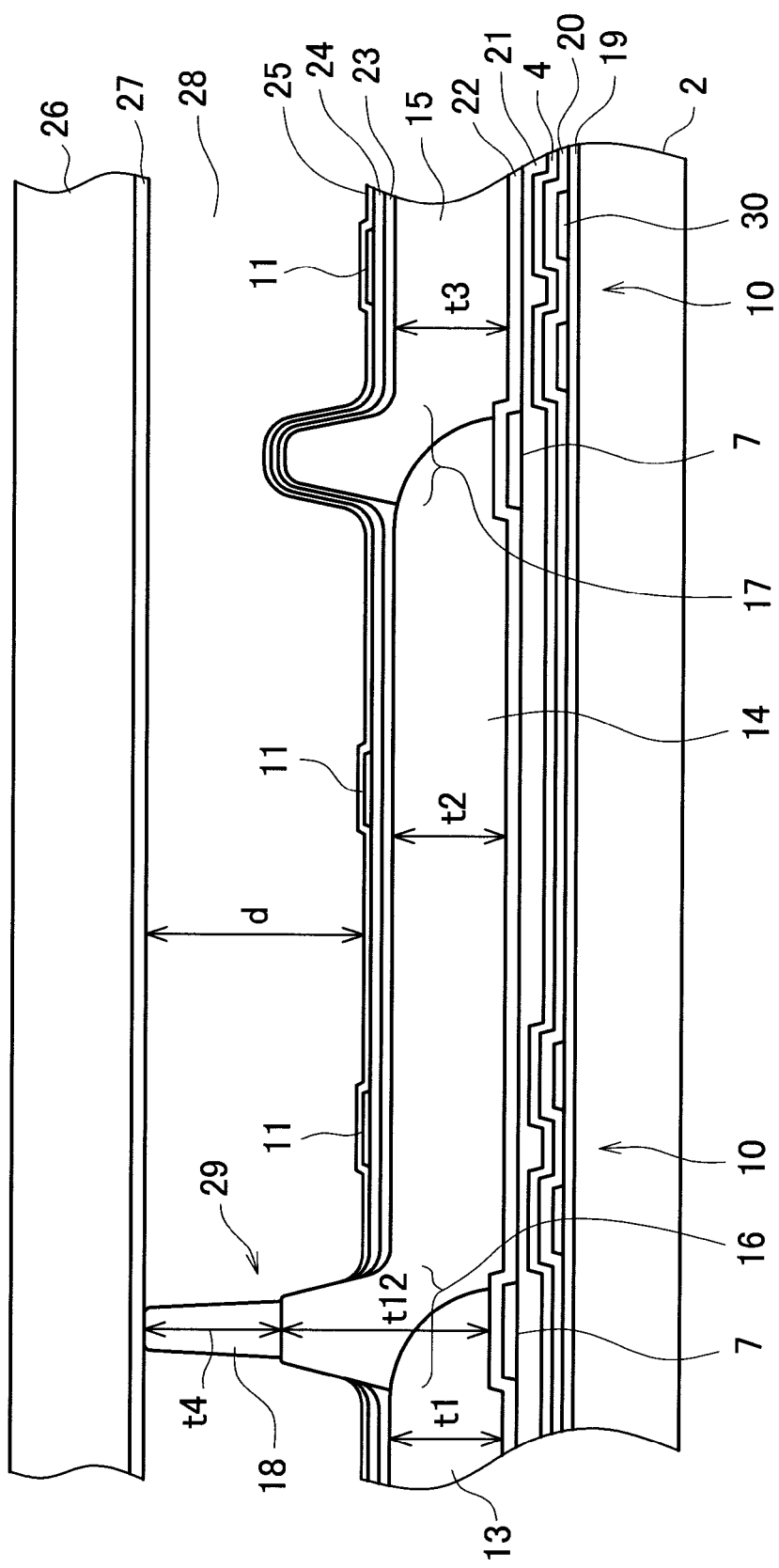
FIG. 3 is a section view along the line A-A of FIG. 2.

FIG. 3 is a sectional view along the line A-A of FIG. 2. A foundation layer 19 is formed on the first substrate 2, and the switching elements 10 are formed on the foundation layer 19. A gate insulating layer 20 is formed as the layer below the scan signal line 4. An insulating layer 21 and the video signal lines 7 are formed as the layers above the scan signal line 4, and furthermore, an insulating layer 22 is formed thereon.

The insulating layer 22 and foundation layer 19 may also be omitted in the event that they are unnecessary.

In the embodiment, a so-called COA (Color filter On Array) structure is employed wherein the color filter layers are formed on the heretofore described layers including the switching elements 10. That is, the first color film 13, second color film 14, and third color film 15 are formed on the insulating layer 22. The first overlapping portion 16 and second overlapping portion 17 are also shown in the drawing. The common electrode 23, an insulating layer 24, the pixel electrodes 11, and an oriented film 25 are formed on the color filter layers. Also, the fourth color film 18 is shown on the first overlapping portion 16. The common electrode 23, insulating layer 24, and oriented film 25 are formed on the color filter layers. An oriented film 27, being formed on a surface of the second substrate 26 opposed to the first substrate 2, sandwiches a liquid crystal layer 28 between itself and the first substrate 2. The common electrode 23 and pixel electrodes 11 are preferably formed from a transparent conductive thin film of ITO (Indium Tin Oxide) or the like.

The first substrate 2 and second substrate 26 are in contact with each other by means of the fourth color film 18 formed on the first overlapping portion 16, and the space between them is kept constant. That is, the first overlapping portion 16 and fourth color film 18 form a post spacer 29, and the space d between the first substrate 2 and second substrate 26 is defined by such a post spacer 29.

However, in the embodiment, as the color filter layers are formed in the order of the red-colored first color film 13, green-colored second color film 14, and blue-colored third color film 15, one portion of the second color film 14 overlaps the first color film 13, and one portion of the third color film 15 overlaps the second color film 14, as shown in the drawing. The fourth color film 18, although not being continuous with the third color film 15, is formed at the same time in a photolithography process when forming the third color film 15. Consequently, the fourth color film 18 is formed in such a way as to overlap the first color film 13 and second color film 14. At this time, as the thickness of the fourth color film 18 is approximately equal to the thickness of the third color film 15, in order to control the height of the post spacer 29, it is necessary to control the thickness of the first overlapping portion 16. Then, the inventor of the present application has found that it is possible to control the thickness of the first overlapping portion 16 by changing conditions when forming the first color film 13 and second color film 14. More specifically, the thickness of the first overlapping portion 16 varies by changing the width by which the first color film 13 and second color film 14 overlap each other, the exposure time and intensity required when forming the first color film 13 and second color film 14 by means of photolithography, the concentration and temperature of a developer, and a developing time. That is, when the thickness of the pixel portion of the first color film 13 is taken as $t_1$, and the thickness of the pixel portion of the second color film 14 as $t_2$, the thickness $t_{12}$ of the first overlapping portion 16 is not a simple sum of $t_1$ and $t_2$. As $t_{12}$ cannot be made greater than the sum of $t_1$ and $t_2$, $t_{12}$ is of a value equal to or smaller than the sum of $t_1$ and $t_2$. As heretofore described, in the embodiment, the height of the post spacer 29 is controlled by forming the fourth color film 18 on the first overlapping portion 16 in which the edge of the first color film 13 and the edge of the second color film 14 overlap each other. The thickness $t_{12}$ of the first overlapping portion 16 means a thickness thereof at the center point of the post spacer 29 when viewed in plan. In the example of the embodiment, as $t_1$, $t_2$, a thickness $t_3$ of the third color film 15, and a thickness $t_4$ of the fourth color film 18 are all in the order of about 3 μm, and it is necessary to make the space d about 4 μm with a view to the operating characteristics of liquid crystal molecules, $t_{12}$ is controlled in such a way as to be approximately 4 μm.

The reason that the colors of the fourth color film 18 and third color film 15 are made the same color is to eliminate the need for a dedicated process for forming the fourth color film 18. Also, the colors of the first to fourth color films, being illustrative examples, may correspond to any colors provided that no color film is black.

Also, the apical portion of the post spacer 29, that is, the fourth color film 18, is such that the top surface thereof is exposed and in direct contact with the second substrate 26 side. This is because, in the event that the common electrode 23, insulating layer 24, or oriented film 25 is formed on the apical portion of the post spacer 29, when an external force such as a vibration acts on the liquid crystal display device 1, there is a possibility that such a layer cracks, falls away, and is discharged into the liquid crystal layer. For this reason, the common electrode 23, insulating layer 24, or oriented film 25 is not formed on the apical portion of the post spacer 29. In order to create this kind of structure, for example, it is sufficient to adopt a configuration such that a layer formed on the apical portion of the post spacer 29 is removed when the contact hole 12 (refer to FIG. 2) which connects the pixel electrode 11 and video signal line 7 is created by photolithography. By adopting this kind of configuration, it is possible to expose the fourth color film 18 without any particular increase of processes.

However, as the color films of differing colors overlap each other in the first overlapping portion 16 and second overlapping portion 17, they have a low light transmittance, and have a certain degree of light blocking effect in themselves. Therein, it is possible to use such first overlapping portion 16 and second overlapping portion 17 in substitution for a so-called black matrix. In the embodiment, furthermore, the first overlapping portion 16 and second overlapping portion 17 are disposed in such a way as to overlap the video signal lines 7. As the video signal lines 7 are metallic wires of aluminum or the like, they have a light blocking effect in themselves, so it is possible to obtain a sufficient light blocking effect in practice by disposing the first overlapping portion 16 and second overlapping portion 17 in such a way that they overlap the video signal lines 7. By so doing, the need to form the black matrix separately in the appropriate place is removed, reducing manufacturing processes.

Continuing, a description will be given, referring to FIG. 4, of a second embodiment of the invention. Unlike the first embodiment, the embodiment is of a type, rather than the so-called COA, wherein the color filter layers are formed on the first substrate 2, and the switching elements 10 are formed on the second substrate 26. A liquid crystal display device 1 according to the embodiment also employs the IPS method. The same subjects as those described in the first embodiment are given identical reference numerals and characters, and a detailed description thereof will be omitted.

Figure 4:
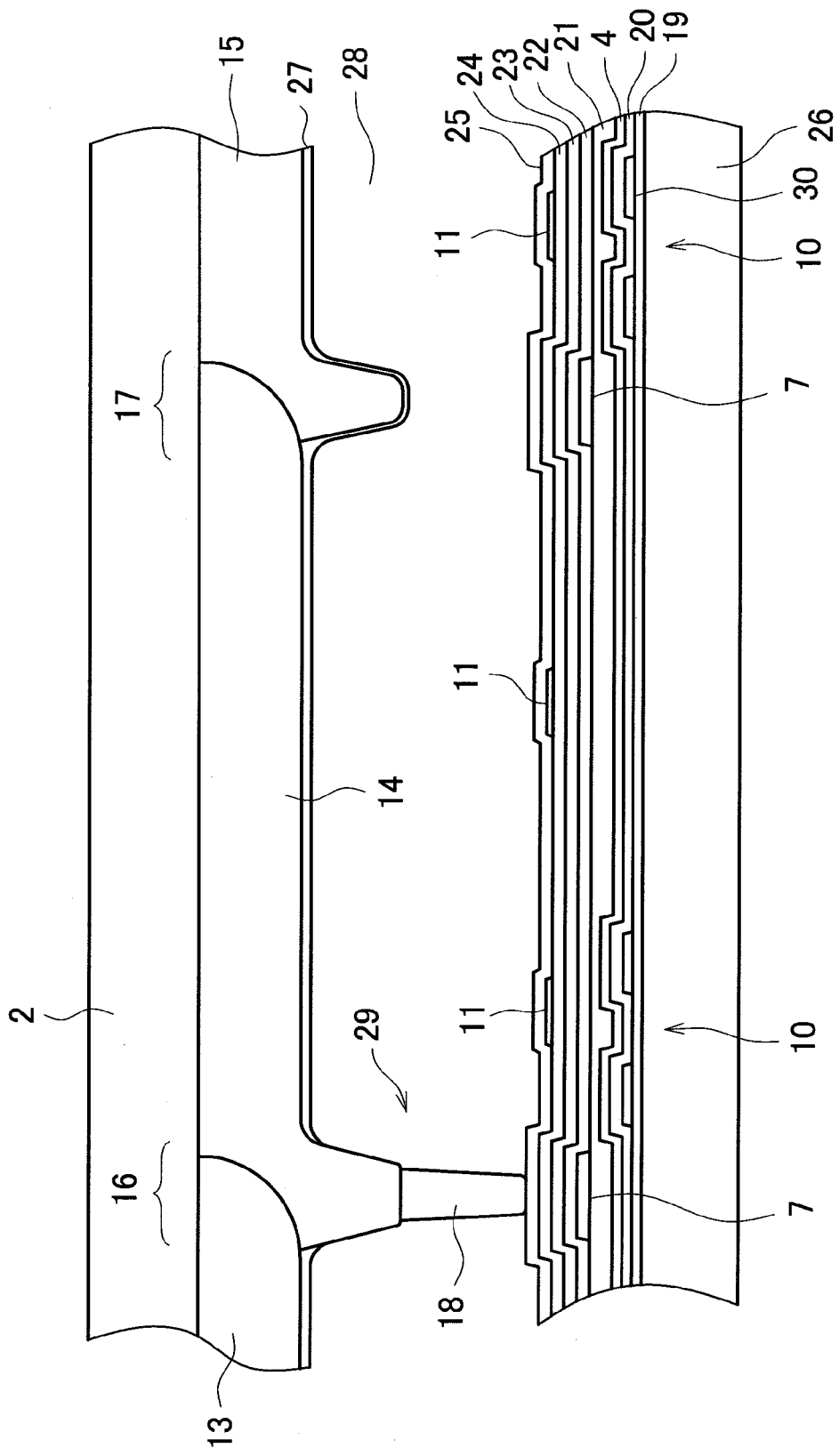
FIG. 4 is an enlarged sectional view of a liquid crystal display device according to a second embodiment.

FIG. 4 is an enlarged sectional view of the liquid crystal display device 1 according to the second embodiment. The same drawing is one corresponding to FIG. 3. In the embodiment, as well as the first color film 13, second color film 14, and third color film 15, which are the color filter layers, being formed on the first substrate 2, the fourth color film 18 is formed on the first overlapping portion 16, creating the post spacer 29.

The second substrate 26 is approximately the same as the first substrate 2 in the first embodiment, except that the color filter layers and post spacer 29 on the first substrate 2 in the previous embodiment do not exist. That is, the scan signal lines 4 and video signal lines 7 are provided on the substrate surface in a reticular pattern, and the switching elements 10 are disposed corresponding to the individual pixels. The foundation layer 19, gate insulating layer 20, insulating layers 21, 22, and 24, common electrode 23, and oriented film 25 are appropriately formed on the second substrate 26.

The first color film 13, second color film 14, and third color film 15, which are the color filter layers, the fourth color film 18, which forms the post spacer 29, and the oriented film 27, are provided on the first substrate 2. In the embodiment too, in the same way as in the previous embodiment, the fourth color film 18 is exposed without being covered with the oriented film 27.

Also, the first overlapping portion 16 and second overlapping portion 17 are provided in positions corresponding to the video signal lines 7, securing the light blocking effect in the boundaries between the pixels.

Furthermore, a description will be given, referring to FIG. 5, of a third embodiment of the invention. The embodiment is one using a vertical electric field method such as VA or TN, rather than IPS, as the liquid crystal drive method in the second embodiment. In the description of the embodiment too, the same subjects as those described in the first embodiment are given identical reference numerals and characters, and a detailed description thereof will be omitted.

Figure 5:
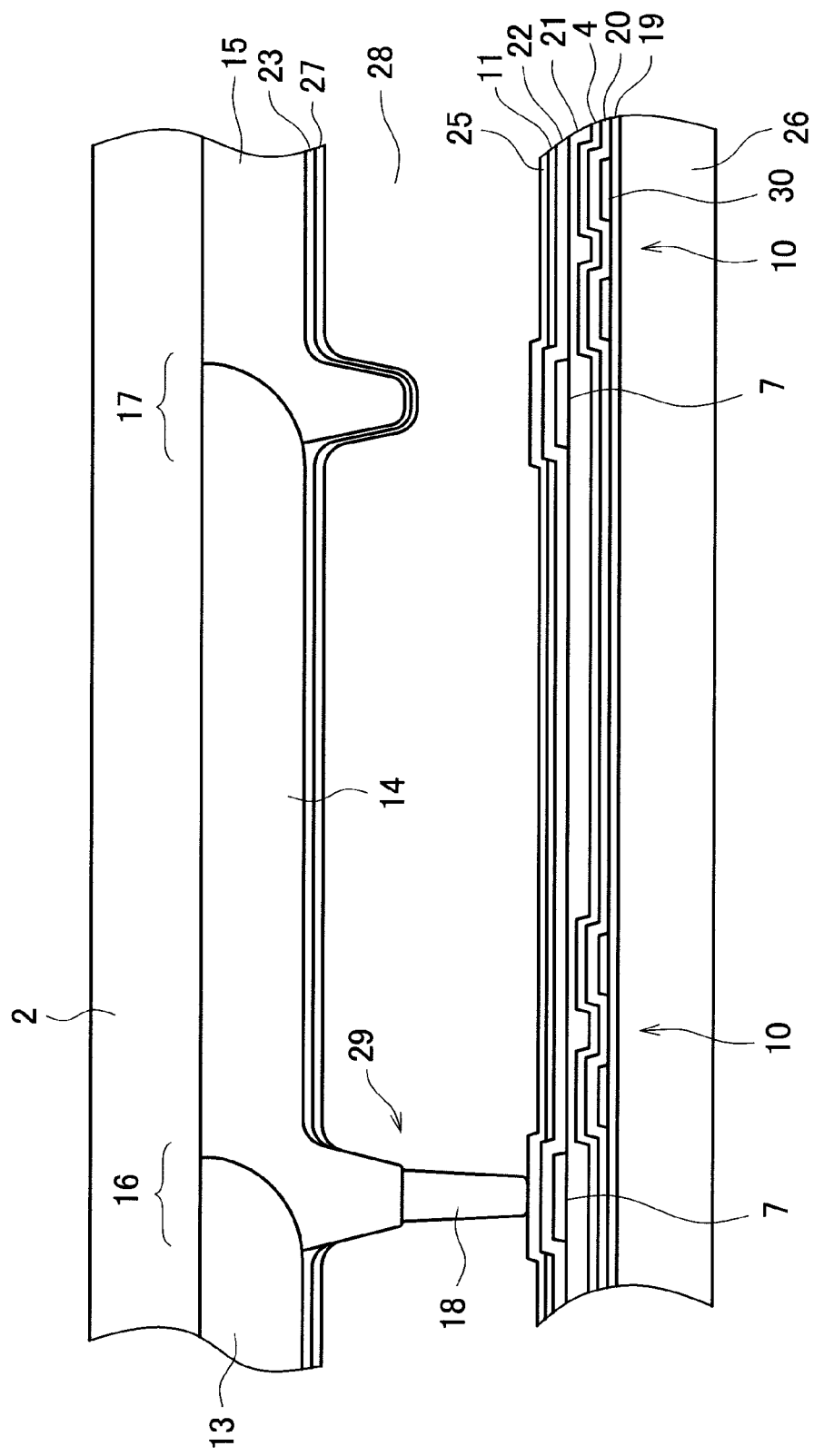
FIG. 5 is an enlarged sectional view of a liquid crystal display device according to a third embodiment.

FIG. 5 is an enlarged sectional view of a liquid crystal display device 1 according to the third embodiment. As shown in the same drawing, the common electrode 23 is provided on the color filter layers of the first substrate 2. Also, although the pixel electrode 11 is provided on the second substrate 26, unlike the first and second embodiments, the shape thereof viewed in plan is not a pectinate shape, but an approximately rectangular shape covering approximately the whole of a pixel. In the embodiment too, the fourth color film 18 forming the post spacer 29 is exposed without being covered with the common electrode 23 and oriented film 27. Other points are the same as those of the second embodiment.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device, comprising:
a first substrate on a surface of which are formed,
a first color film which has a color other than black, and one portion of which configures a first pixel,
a second color film which has a color, other than black, which differs from that of the first color film, and one portion of which configures a second pixel adjacent to the first pixel,
a third color film which has a color, other than black, which differs from those of the first color film and second color film, and at least one portion of which configures a third pixel, and
a fourth color film which has a color, other than black, which differs from those of the first color film and second color film;
a second substrate; and
a liquid crystal layer sandwiched between the first substrate and second substrate, wherein
the first color film and second color film have an overlapping portion in which they overlap each other in the boundary between the first pixel and second pixel, and
the fourth color film, being formed on the overlapping portion, configures a spacer which defines the space between the first substrate and second substrate;
wherein the sum of the thickness of the first color film and second color film in the overlapping portion is smaller than the sum of the thickness of the first color film in the first pixel and the thickness of the second color film in the second pixel; and
a conductive film and an insulating film are formed on top of the first pixel, the second pixel, and the third pixel, and a top surface of the fourth color film is such that the fourth color film is exposed.

2. The liquid crystal display device according to claim 1, wherein the fourth color film is of the same color as the third color film.

3. The liquid crystal display device according to claim 1, wherein
a plurality of scan signal lines, a plurality of video signal lines, and switching elements provided one in each pixel, are formed on the first substrate.

4. The liquid crystal display device according to claim 3, wherein
the overlapping portion is provided in such a way as to overlap a scan signal line or a video signal line.

5. The liquid crystal display device according to claim 1, wherein
the conductive film and the insulating film, which are formed on top of the first pixel, the second pixel and the third pixel, are not formed on the fourth color film configured as the spacer, the fourth color film configured as the spacer being formed directly on the overlapping portion of the first color film and the second color film in the boundary between the first pixel and the second pixel.

* * * * *